US008732246B2

(12) United States Patent
Jayanthi (10) Patent No.: US 8,732,246 B2
(45) Date of Patent: May 20, 2014

(54) MOBILE SOCIAL NETWORK FOR FACILITATING GPS BASED SERVICES

(76) Inventor: Madhavi Jayanthi, Laguna Niguel, CA (US)

( * ) Notice: Subject to any disclaimer, the term of this patent is extended or adjusted under 35 U.S.C. 154(b) by 491 days.

(21) Appl. No.: 12/075,932

(22) Filed: Mar. 14, 2008

(65) Prior Publication Data

US 2009/0233629 A1    Sep. 17, 2009

(51) Int. Cl.
*G06F 15/16* (2006.01)
*G06F 15/173* (2006.01)
*H04L 29/08* (2006.01)
*H04L 12/58* (2006.01)

(52) U.S. Cl.
CPC .............. *H04L 67/18* (2013.01); *H04L 51/04* (2013.01); *H04L 51/066* (2013.01); *H04L 67/36* (2013.01)
USPC ........................... 709/205; 709/206; 709/223

(58) Field of Classification Search
CPC ....... H04L 51/04; H04L 51/066; H04L 67/18; H04L 67/36
USPC ....................................................... 709/205
See application file for complete search history.

(56) References Cited

U.S. PATENT DOCUMENTS

| 5,570,109 | A | * | 10/1996 | Jenson | 715/823 |
|---|---|---|---|---|---|
| 6,973,319 | B2 | * | 12/2005 | Ormson | 455/456.1 |
| 2006/0069604 | A1 | * | 3/2006 | Leukart et al. | 705/9 |
| 2006/0224433 | A1 | * | 10/2006 | Baek et al. | 705/9 |
| 2007/0038494 | A1 | * | 2/2007 | Kreitzberg et al. | 705/8 |
| 2007/0129954 | A1 | * | 6/2007 | Dessureault | 705/1 |
| 2007/0271367 | A1 | * | 11/2007 | Yardeni et al. | 709/223 |
| 2007/0273558 | A1 | * | 11/2007 | Smith et al. | 340/995.1 |
| 2008/0004043 | A1 | * | 1/2008 | Wilson et al. | 455/456.3 |
| 2008/0119176 | A1 | * | 5/2008 | Chen et al. | 455/414.2 |
| 2008/0132243 | A1 | * | 6/2008 | Spalink et al. | 455/456.1 |
| 2009/0024315 | A1 | * | 1/2009 | Scheibe | 701/208 |
| 2009/0177385 | A1 | * | 7/2009 | Matas et al. | 701/209 |
| 2010/0062794 | A1 | * | 3/2010 | Han | 455/457 |

* cited by examiner

*Primary Examiner* — Richard G Keehn (57) ABSTRACT

Using a map displaying one or more mobile devices based on their current locations, a user of a mobile social networking server selects one or more of his friends, from one of a plurality of friend lists supported, to communicate collectively and share information collectively. For example, by selecting one or more of his friends from one of the friends lists, the user can communicate a recorded message, initiate a conference call, send a task list, retrieve information from their mobile devices, send notifications, etc. If the user of a first mobile device accesses the mobile social networking server using the first mobile device, that user can select one or more friends (from a selected current list) and access their blogs and review their data.

20 Claims, 6 Drawing Sheets

MOBILE SOCIAL NETWORK FOR FACILITATING GPS BASED SERVICES

CROSS REFERENCES TO RELATED APPLICATIONS

Not Applicable

BACKGROUND

1. Technical Field

The present invention relates generally to a mobile device and particularly to a solution wherein location information from a plurality of mobile devices communicated to a mobile social networking server.

2. Related Art

Mobile devices are becoming ubiquitous. Children carry them and so do adults. Children use them to ask their parents to come pick them up at a mall or a park. Often parents spend a lot of time trying to locate their child at a mall when they get a call for a ride. Similarly, children wait for a long time outside a mall waiting for their parents to arrive, often in inclement weather. This problem is also faced by mobile users who travel to a new country on business and pleasure and wait for a taxi pickup at an airport, outside an airport or in train stations.

Quite often, a user has a mobile phone with a GPS and may desire to go to a store. The user has to type in an address to activate the GPS based navigational facilities. The address could be long and comprise of more than 50 characters quite often, making the user struggle with the painfully small and cramped keyboard on the mobile device. Quite often the keyboards on a mobile device has 3 letters of the alphabet mapped into a single key that makes data entry very complicated and tiring.

Quite often a user looks up a store in a phone book and gets a phone number to the store. However, the user does not know the location or directions to the store. The user is forced to call the store using the phone number, write down directions and then hope to find it while driving.

People, especially the youth, have started interacting with each other using a social networking services, forming a community of online users who can share personal details and meet other people. Such social networks provide the ability to create blogs with personal details, etc. and share them within the community. However, such social interactions are not easily migrated to the mobile environments yet. In addition, the concepts of mobility and social networking have not been combined effectively, and even rudimentary integrations between the two are not currently available in the market. Thus, the phenomenon of social networking on the Internet and the technology revolution of mobile devices have bypassed each other with no effective solutions yet having been developed that leverage the advantages of one for useful interactions enabled by the other.

It may be possible for a member of a social network to specify where he is resident (which city), but that is only a static information. People travel all the time, and the social networks do not have an easy and efficient way for another member to determine where all his friends in a social network are currently located. All that the member can do is browse through a list of friends, looking at their addresses and expect to find them at those locations, which are static locations, often outdated and not updated, and do not really show a current/temporary address/location.

If a person wants a ride (in a car, motorcycle etc.) from a friend, the person often has to call a taxi or call his friends (or more than one friend) to see if any of them can give him a ride, and if they are able to currently even help him. The person has no way to determine if any of his friends in his social community are currently in a position to help him out by giving him a ride.

vCard standard for exchanging electronic business cards has been around for some time and is used for sending email attachments of business cards. They can contain name, address, phone numbers, logos, URLs and photos. However, they do not really help a user in easily navigating from his house to a business (such as a store). There are some deficiencies in the contents of most vCards. Other variations to vCards exists, such as hCard that provide similar features. However vCard information comprises mostly static information, and does not reflect the current location or even the current contact information of a user.

GPS satellites have been used for a while for navigation. GPS satellites do not actually pinpoint your location as is commonly believed. The 24 satellites circling the earth each contain a precise clock that transmits a signal comprising a time to the GPS receiver in a user's mobile device. The mobile device processes the satellite signals to determine geometrically where the user is located.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
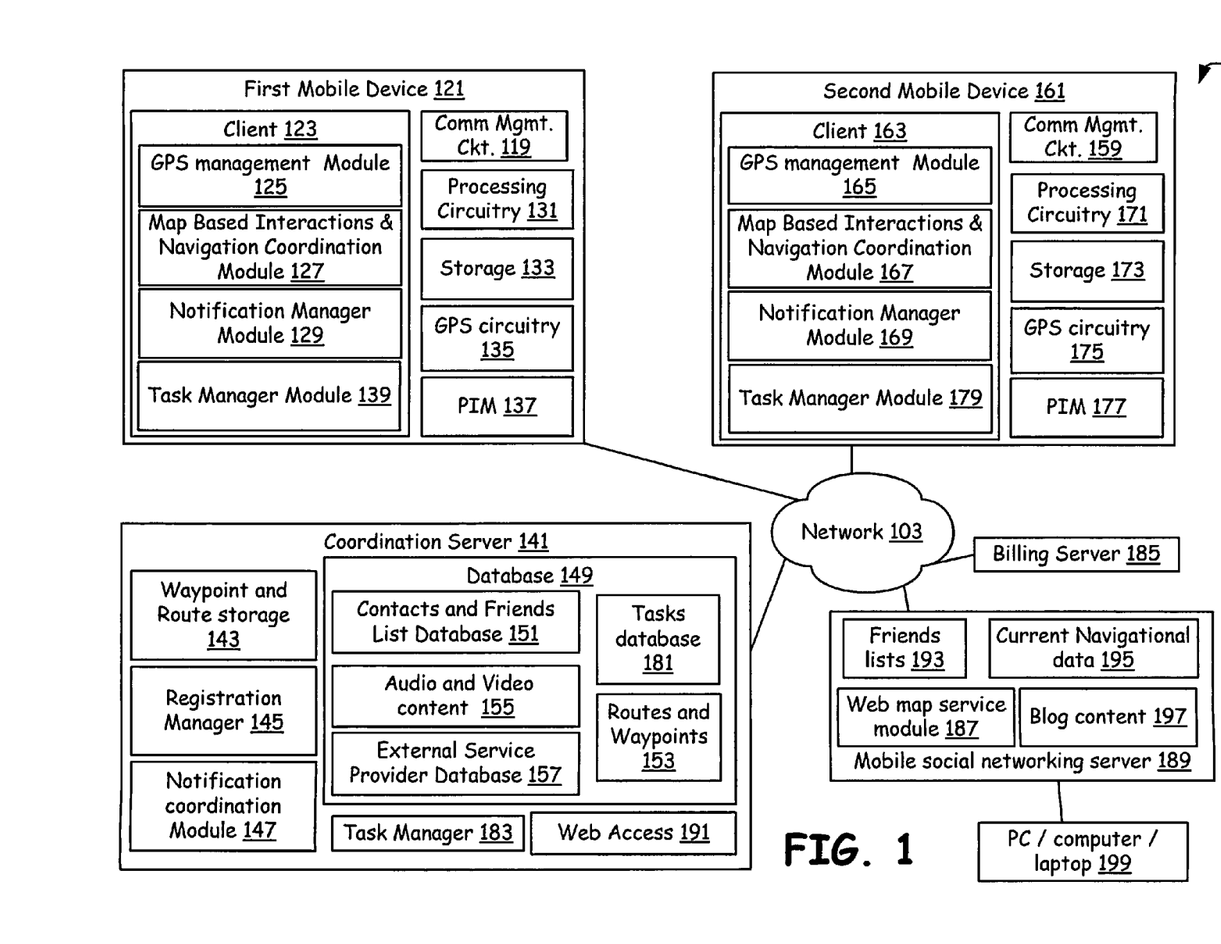
FIG. 1 is a perspective block diagram of a mobile web system wherein a mobile social networking server collects a current location data from a plurality of mobile devices and facilitates selection of one or more of the plurality of mobile devices for subsequent interactions, such as sending task lists or communicating using voice data or telephone calls.

The present invention provides an elegant means of interaction between people who are mobile wherein the location information from a plurality of mobile devices 121, 161 is communicated to a mobile social networking server 189 or a coordination server 141 and GPS based services are accessed, such as a service to communicate with the users of the plurality of mobile devices. Using the communicated location information, the mobile social networking server 189 guides users to locations, communicates data/directions/task lists etc. to the plurality of users via their mobile devices 121, 161, employing their current location for determining their ability to participate. In addition, when a mobile user is close to (in proximity within 1 mile, for example) another user, their mobile devices 121, 161 can be notified if necessary. Using a map displaying one or more mobile devices based on their current locations, a user of a mobile social networking server selects one or more of his friends. Using such a map showing, for example, current locations based on GPS coordinates on the map, a user of the mobile social networking server 189 can select one or more of his friends, from one of a plurality of friend lists 193 supported, to communicate collectively and share information collectively. For example, by selecting one or more of his friends from one of the friends lists 193, the user can communicate a recorded message, initiate a conference call, send a task list, retrieve information from their mobile devices, send notifications, etc. If the user of a first mobile device 121 accesses the mobile social networking server 189 using the first mobile device 121, that user can select one or more friends (from a selected current list) and access their blogs and review their data. For example, the data collected in the field by these one or more friends/colleagues, or details of tasks completed by these one or more friends can be retrieved and reviewed, and even commented upon or responded to.

FIG. 1 is a perspective block diagram of a mobile web system 101 wherein a mobile social networking server 189 collects a current location data from a plurality of mobile devices 121, 161 and facilitates selection of one or more of the plurality of mobile devices 121, 161 for subsequent interactions, such as sending task lists or communicating using voice data or telephone calls. The web system 101 comprises the mobile social networking server 189, the plurality of mobile devices 121, 161, the coordination server 141, and a network 103 that facilitates communication and interactions. It also comprises a billing server 185.

The first mobile device 121 with a client software 123, used by a first user, and the second mobile device 161 with a client software 163, used by a second user communicate (periodically, when requested, etc.) a current location information to the coordination server 141, which makes it available to the mobile social networking server 189. The current location information can be used to map the first user and the second user and determine where they are location vis-à-vis each other or with respect to a third location. The mobile social networking server 189 presents a map viewing service that can be accessed from computers/PCs/laptops/mobile devices 121, 161 by other users, where the current location received from the first mobile device 121 and the second mobile device 121 are selectively represented. Thus, the map viewing service represents mobile devices based on their current location, i.e. based on the associated navigational information, such as GPS coordinates, received from the mobile devices 121, 161. For example, each of the mobile devices 121, 161 can be represented using a small icon on a map presented by the map service. In addition, certain details of the mobile device or its current users can be displayed with each icon representation of the mobile devices on the map.

The map service provided by the mobile social networking server 189 supports selecting one or more of the displayed representations of mobile devices (by means of the icons), and communicating tasks from a task list, communicating entire task lists, making voice calls, communicating recorded voice and video messages, sending notifications/alerts, communicating data, etc. The map service can display representations of mobile devices wherein the mobile devices are associated with one or more groups of friends, buddy lists, or groups of friends whose memberships have been extracted from one or more friends lists or external social networks.

The mobile devices 121, 161 comprise a client software 123, 163 respectively that facilitate interactions with the mobile social networking server 189. For example, the second mobile device 161, employs the client software 163 in the second mobile device 161 to interact with the mobile social networking server 189. The mobile social networking server 189 can send a list of tasks to the second mobile device 161 that is received and displayed by the client software 163. The client software 123, 163 also facilitate user interaction, such as selection of the tasks in the communicated task list by a user, status reports and responses provided by the user after completing the tasks, inputs provided by the users to queries sent by the mobile social networking server 189, etc.

In one embodiment, the mobile social networking server 189 sends questionnaires, queries, advertisements to the mobile devices based on a current location communicated by the mobile devices to the mobile social networking server 189. In addition, it forwards messages waiting and tasks assigned to the mobile devices, wherein the messages forwarded and tasks assigned are based on the current location information retrieved from or received from the mobile devices.

The mobile social networking server 189 provides information to a remote user, such as a remote user using a browser on a remote PC/computer/laptop 199 to connect to the mobile social networking server 189, that will guide the remote user to a location where another mobile user, such as a first user employing the mobile device 121, is currently located. For example, based on a current location reported by or retrieved from the first mobile device 121, a map, remotely viewed by the remote user on his remote PC/computer/laptop 199, that is presented by the mobile social networking server 189, is enhanced with a representation (such as a small icon, graphic, etc.) of the first mobile device 121. A representation of the user of the first mobile device, instead of a representation of the first mobile device 121, is also contemplated. The remote user can select the representation on the map presented and request directions to that location from his current location, which may be determined automatically by the mobile social networking server 189, and received as input from the remote user.

The mobile social networking server 189 comprises a friends lists 193 that can be managed by the users/members, a current navigational data 195 that provides current location information and related data for a plurality of mobile users, a web map service module 187, and a blog content 197 that provides various blogs managed/created by the various mobile users/members of the mobile social networking server 189. Mobile users can update their blogs with data and different kinds of content, and share it with other members of a friends list (for example). These blogs can be dynamically updated with data of different kinds and shared with other mobile users, or with other remote users such as a remote user using the PC/computer/laptop 199. The web map service module 187 returns a map whose geographic and dimensional parameters are well-defined and returns information about particular features shown on a map when requested. It supports web services and returns maps via the web services too. It publishes its ability to produce maps, e.g. the operations and available geographic information through the application metadata in the format of XML. The special aspect of web map service module is that it is invoked by a request sent from a standard web browser in the form of Uniform Resource Locators (URLs), or via web services invoked by a PC/computer/laptop 199 or server. It provides a "Basic map service" which can be used by a user to retrieve a web map using a URL that may be displayed by the client software 123, 163 in the mobile device 121, 161 or a web browser on the PC/laptop/computer 199. It also provides a location aware map service that maps a given list of friends employing their current locations as specified by GPS data or other coordinates/address retrieved from their corresponding mobile devices. The location aware map service defines a boundary/size of the map based on the number of people whose current locations are to be mapped onto a map that is created dynamically. For example, if 7 friends from a friends list whose current locations are retrieved from their mobile devices by the current navigational data module 195, have to be mapped onto a map, the web map service module 187 adjusts the area of the map to be displayed to include those 7 geographical coordinates or locations.

The mobile social networking server 189 makes it possible for the second user to upload/update data and messages to his blog from the second mobile device 161, after reaching a desired location. The blog data is accessible by the first user on his first mobile device 121, and the first user gets a notification alerting the first user that the second user has reached the desired location and has updated his blog. Thus, based on the current location information received from the second mobile device 161, one or more mobile devices (such as the first mobile device 121) can receive a notification and be able to review data and messages blogged by the second user from the second mobile device 161. In one embodiment, the blog data comprises streaming video that is captured by the second user and shared with other users in a friend's list.

In general, the client software 123 and the client 163 comprise similar functionality and are capable of sending/receiving location information, blogged contents, sending and receiving notifications, and consuming the location information in guiding an associated user to a desired location/destination. The client software 123 and the client 163 makes it possible to store GPS coordinates of various locations and store it for subsequent use. For example, when the first user is given a ride to his house, such as by a the second user, using his vehicle, the second user can save the location coordinates, such as using GPS coordinates, employing the client software 163 available in his GPS enabled second mobile device 161 (such as a cell phone, PDA, etc.) In particular, the personal information manager (PIM) 177 is used by the client software 163 to store the location coordinates, and associate it with the first user's contact information available (or created) in the PIM 177.

The present invention facilitates communicating, from a mobile device, arrival information at a waypoint, communicating that information to a coordination server 141, receiving a set of tasks (statically assigned or dynamically assigned) for the user, displaying the set of tasks to the user, receiving a completion response (successful or unsuccessful) from the user and storing it as part of the blog content 197 associated with that user, and proceeding to the next waypoint along a route/trip plan.

The present invention makes it possible to map a phone number (of a business or residence, for example) into a corresponding GPS coordinates (such as longitude and latitude). It also makes it possible to dynamically retrieve such mapping information from mobile devices 121 161, if necessary, and with optional user consent.

The user can go to a portal (for example) or the mobile social networking server 189 and view a map presented, with the current locations of one or more individuals (friends, colleagues, etc.) highlighted on the map. The portal/mobile social networking server 189 presents a map to the user and displays current positions of a group of people driving GPS enabled vehicles or carrying GPS enabled mobile devices, for example. The mobile social networking server 189 can determine the current locations of the group of people. Multiple groups of people are supported, with one of them being used as a current group (or default group). In addition, more than one group can be shown simultaneously at a time on the map, in accordance with user preferences and selections. Thus, one or more people are selected based on the current locations, as provided by the mobile devices they currently use, or based on information determined from a device/vehicle/etc. that they are currently employing.

By selecting location information, represented by an appropriate text, icon, graphics, etc. on a map (presented by the portal or by a computer used by a user) one or more such user devices/vehicles/equipment can be selected on the map, and the user can interact with a plurality of those people. For example, the user can talk to them (such as, by establishing an adhoc conf call, by sending a recorded message to them that is played on the recipient's mobile devices, etc.). In addition the user can also send data to them.

The user can form a broadcast group or a multi-cast group from that webpage with map displaying current location of users, a dynamic location determination method providing the current locations of one or more individuals of interest to the user. Multiple groups/lists of such individuals are created and maintained by the user. From a given/current list, the user can select one or more recipients dynamically from the map employing their current locations, and interact with them. For example, by selecting the left mouse button and dragging on a map, an area of the map is selected and all mobile devices displayed in that area of the map are listed as targets for an action, such as a file transfer, an audio or textual notification to be sent, a task list to be delivered, etc. Similarly, on devices that don't provide a mouse, other means of selecting multiple mobile devices as targets for an activity are contemplated. For example, using a stylus on a device display that supports a pen interface makes it possible to select an area of a displayed map and determine all mobile devices within that area of a map.

The present invention provides a portal/mobile social networking server 189 that presents/displays map for the user on his mobile device 121 (or on a PC/notebook/PDA/computer 199) with a default map area, and default set of mobile devices mapped by their current locations. The default map area is the user's current location or a pre-configured location. Current data from each of the mobile devices/associated users can be accessed by double clicking on the mobile phones (or representations of individuals using them) displayed on the map—an associated blog section for those users is displayed. These users of the mobile devices can upload their blogs from their mobile devices 121, 161, such as by recording audio content, taking pictures or video, etc. and storing them in their blogs.

The portal or the mobile social networking server 189 coordinates interaction with the user manipulating the map and the various groups of users (or a subset or combination thereof) that the user chooses to interacts with. For example, a recorded message (in audio form) is sent to all of them and responses provided by the recipients is collected and presented to the user (who is the sender).

The user using the map presented by the mobile social networking server 189 can drag and drop a task list onto a selected list of icons (representing mobile devices or their current users) on a map that, for example, is showing their current locations. The icons are selected, for example, using a rectangular or circular region of the map defined by a dragging a cursor (using a mouse for example, or by other means) mouse on the map. In a related embodiment, a task from a collection of available tasks is assigned to the first person (with a mobile device that is GPS enabled and communicatively coupled) that reaches a specific landmark, location or a waypoint along a route (that may be monitored).

A user can select one or more icons from a map presented, and in doing so, select the associated mobile devices as target for an action, wherein the action is sending a recorded message to all of them and receiving an optional response from the recipients. Thus, the user can communicate using a recorded voice message that is sent to the selected list of icons on the map.

In one embodiment, the second user using the second mobile device 161 can update the PIM 177 entries in the second mobile device 161. The second user is prompted to select one or more PIM 177 entries (contacts in the PIM) and associate a location coordinates with the PIM 177 entries. The updated contact information stored in the PIM 177 comprises GPS coordinates and other navigational data (including optional routes). Such updated contact information can be retrieved in standard formats, such as VCF, and sent as attachments to emails, instant message, etc. When the first user sends an email, and attaches his contact information, such as a contact information in VCF format, the GPS coordinates typically associated with his address (him home address, for example) is sent in the contact information. In one embodiment, the first user's current location coordinates is retrieved using the client software 123 in the first mobile device (dynamically, as and when needed) and incorporated into the contact information in VCF format that is sent as an attachment in an email, etc.

In general, a device 121, 161, 199, comprising a processing circuitry, a communication module and a client software 123, 163 capable of interacting with a mobile social networking server 189 employing the communication module is capable of displaying maps to a user showing current locations of his friends and colleagues. The client software receives a map from the mobile social networking server 189 comprising representation of individuals associated with at least one of a plurality of friends lists showing their associated current locations on the map. Such friends lists are managed by the user of the device, and the user can specify which of those (one or more) plurality of friends lists should be used to depict the associated current locations on the map. The client software displays the map received and the client software facilitates the selection of a target collection, by the user, employing at least one of the representation of individuals associated with at least one of a plurality of friends lists, for subsequent interactions. For example, the user can select one or more individuals represented on the map, based on their current locations, and interact with them. The device may be a mobile device 121, 161 or a PC/computer/laptop 199, etc.

The device initiates subsequent interactions after the user selects one or more friends to be part of a target collection, from the displayed map, wherein the subsequent interacts comprise communicating at least one appropriate task to at least one of individuals in the target collection. The subsequent interactions may comprise communicating at least one appropriate task to a target device currently associated with one of the at least one of individuals in the target collection. The selection of the target collection, in one related embodiment, comprises determining a drag area specified by the user by dragging a geometrical shape on the map and identifying those of the representation of individuals associated with at least one of a plurality of friends lists as being currently located inside the drag area based on their associated current locations on the map.

In one related embodiment, the subsequent interactions comprises communicating with the individuals associated with the target collection employing one of a audio conference means, a video conference means, a chat means, an instant messaging means and an email means. In a different embodiment, the subsequent interactions comprises automatically retrieving a blog content for each of the individuals in the target collection and presenting them to the user of the device. In yet another embodiment, the subsequent interactions comprises automatically assign at least one task from a task list to at least one individual in the target collection. Again, in a related embodiment, the subsequent interactions comprises automatically sending a request to provide data to the individuals in the target collection.

In general, the mobile social network server 189 comprises the current navigational data module 195 and the web map service module 187 that produces a map of spatially referenced data dynamically and returns the map to a remote device, such as mobile devices 121, 161 and PC/computer/laptop 199. The current navigational data module receives a current navigational data from a plurality of mobile devices 121, 161 communicatively coupled to the mobile social network server 189, which also comprises at least one friends lists, that is stored and managed using the friends list module 193. Each of the at least one friends lists comprises a plurality of contact information associated with a plurality of friends. The web map service module 187 displays a current location for one or more of the at least one friends lists on a map presented to a user. The mobile social network server 189 is also communicatively coupled to another server, in one embodiment, such as the coordination server 141. The current navigational data module receives the current navigational data from the another server, wherein the current navigational data comprises at least a current location information from a plurality of mobile devices associated with the one or more of the at least one friends lists. In a related embodiment, the mobile social network server 189 presents the map comprising representation of individuals associated with the one or more of the at least one friends lists to a user.

The mobile social network server 189 receives a target collection from the user based on the representation of individuals associated with the one or more of friends lists that the user views on a presented map. The mobile social network server 189 communicates an appropriate task list to each of the individuals in the target collection, using the mobile devices or other devices for those individuals (using their mobile devices) who are selected as recipients (their mobile devices are used as destination devices). In a related embodiment, the target collection comprises a list of phone numbers of mobile devices associated with the selected individuals that are currently represented on a map. Individuals associated with one or more of the user's friends lists selected by a user are represented on the map. The target collection is usually specified by the user employing a drag operation on the map presented to the user. The appropriate task list assigned to each of the items in the target collection is specified by the user.

The present invention provides a method of efficient communication between the first mobile device 121 and a plurality of second mobile devices 161. The method comprises displaying, by the first mobile device 121, a representation of the plurality of second mobile devices 161 on a map presented to the user of the first mobile device and accepting a target collection specified by the user of the first mobile device wherein the target collection comprises one or more of the plurality of second mobile devices 161. It also comprises the steps of assigning user specified tasks, by the user using the first mobile device 121, to the target collection and then receiving responses, by the first mobile device 121, from the mobile devices comprised in the target collection. The responses are showed/displayed by the first mobile device 121, to the user.

The process of accepting a target collection comprises facilitating a drag operation by the user on the map presented to the user and determining the target collection based on the representation of the plurality of second mobile devices 161 on the map. The process of assigning comprises identifying a list of tasks to be completed and mapping the list of tasks to the target collection based on the current location information associated with each of the one or more of the plurality of second mobile devices in the target collection. It also comprises prompting the user to communicate appropriate ones from the mapping of the list of tasks to the corresponding ones of the one or more of the plurality of second mobile devices in the target collection.

In one embodiment, the method of communicating also comprises conferencing, employing audio conferencing or video conferencing means, with the target collection, by the first mobile device. Communicating a message to the target collection by the first mobile device is also supported, employing a textual message means or an audio message means.

Figure 2:
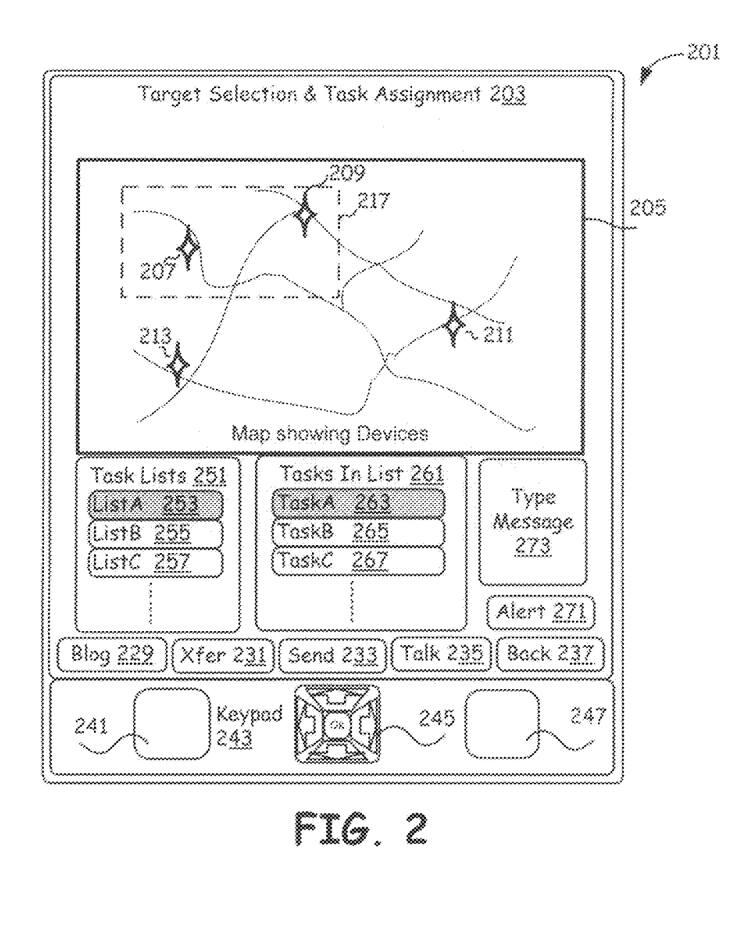
FIG. 2 is an exemplary snapshot of a target selection & task assignment screen of the mobile phone that is presented to a user by the client software available in the mobile device in accordance with the present invention.

FIG. 2 is an exemplary snapshot of a target selection & task assignment 203 screen of the mobile phone 201 that is presented to a user by the client software available in the mobile device 201 in accordance with the present invention. The target selection & task assignment 203 screen comprises the map 205 showing devices associated with one or more friends lists maintained and managed by the user of the mobile device 201. The user can select one or more devices and communicate with the users of the devices. The user can select one or more devices from the map, wherein the devices are represented using icons, such as graphic icons, text icons, logos, etc. The user can drag a geometrical shape, such as a rectangle formed by dragging a mouse on the map and select one or more icons representing mobile devices or users of mobile devices. The user can also draw a geometrical shape on the map for selection, such as by using a pen stylus and drawing a box on the map. The exemplary screen 203 shows a box 217 drawn on the map 205 wherein the box 217 comprises two icons 207, 209 representing two mobile devices based on their current locations (retrieved by a server and communicated with the map, for example).

The screen 203 screen also presents a task lists frame 251 comprising one or more tasks lists 253, 255, 257 that can be assigned to individual mobile devices (or their users) selected on the map 205. In addition, when an item in the task lists 251 is selected, the corresponding tasks are listed in a tasks in list frame 261. The user can select one of the task lists 251, such as ListA 253, and drag and drop it onto one of the icons such as icon 207 to have the task list ListA 253 communicated to the mobile device associated with the icon 207.

A type message 273 input frame (such as a dialog box or text entry box) makes it possible to type a message that is communicated to the currently selected icons/mobile devices on the map, when the user activates the send button 233. A talk 235 button when activated by the user makes it possible to establish a conference with the currently selected icons/mobile devices (such as 207, 209 selected in the box 217). Such a conference employs an audio conference means, a video conference means, etc, based on mobile device 201 capability and user preferences. A xfer 231 button, when activated, makes it possible to transfer files, pictures, data, etc. to the currently selected icons/mobile devices (such as 207, 209 selected in the box 217) on the map 205. A blog 229 button, when activated, makes it possible to retrieve latest entries from blogs maintained by the currently selected icons/mobile devices (such as 207, 209 selected in the box 217) on the map 205. In a related embodiment, the user can access blogs for each user represented on the map 205, by selecting any icon on the map, such as the icon 207, and then activating the blog 229 button. The user can then peruse the blog of the selected user/mobile device, the blog being presented in a different window or frame (such as a pop-up window).

When the user selects one or more icons on the map 205 and sends an alert message by activating an alert 271 button, the mobile device 201 makes it possible for the user to communicate a canned alert message or a user-created alert message to the currently selected users/mobile devices. The user can select one of a set of canned messages available or create a new message. For example, a canned alert comprising the textual message "make sure you take pictures" is sent to the currently selected icons/mobile devices (to be viewed by their associated users) 207, 209.

The target selection & task assignment screen 203 also comprises a joystick 245 on a keypad 243, in addition to left and right selection buttons 241, 247 respectively. The 'joystick' 245 facilitates scrolling through lists, selection of items from a list, selection of buttons, etc.

Activating the 241 key from the keypad 243 opens the options functionality, which results in presenting the user with a list in a menu or sub-menu, which can be browsed using the 'joystick' 245. When the key 247 is activated on the keypad 243, a screen transition functionality is typically invoked to cancel the current screen to go back to a previous one.

Figure 3:
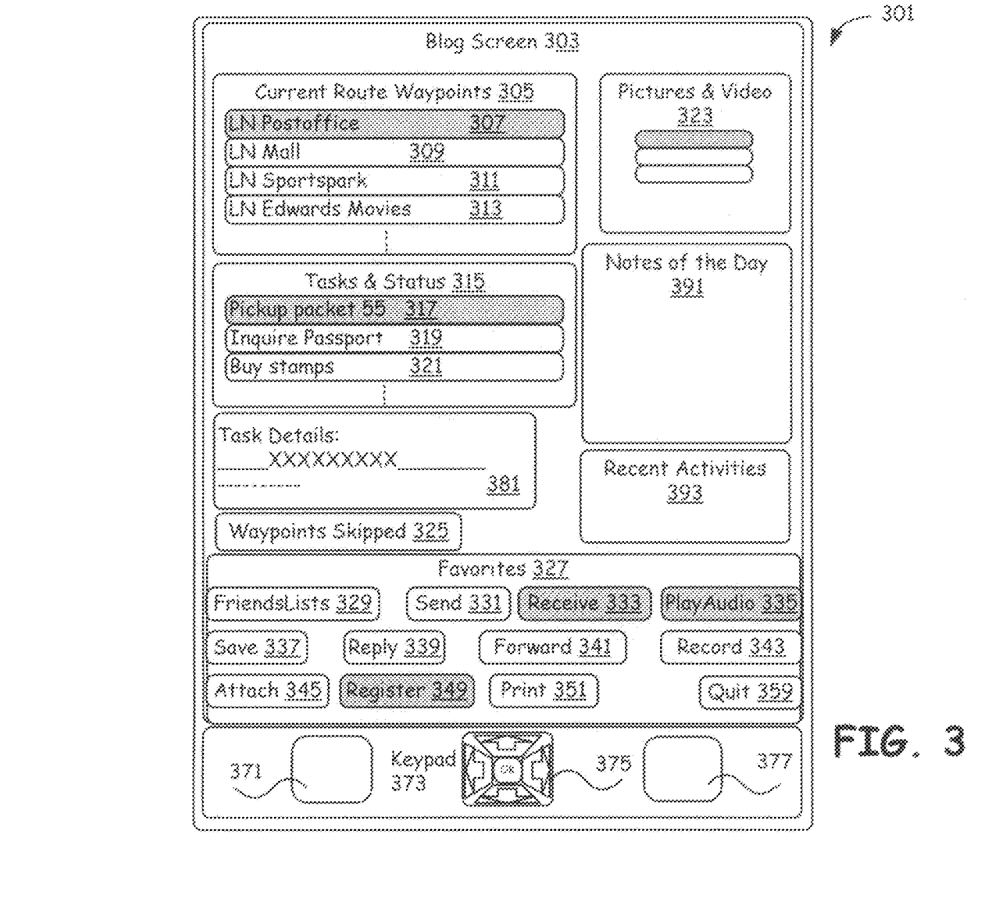
FIG. 3 is an exemplary blog screen displayed on a mobile device when the user of the mobile device selects, on a map presented, an icon representing another user, or a mobile device associated with the another user, and invokes the blog button.

FIG. 3 is an exemplary blog screen 303 displayed on a mobile device 301 when the user of the mobile device 301 selects, on a map presented, an icon representing another user, or a mobile device associated with the another user, and invokes the blog button. In response the blog screen 303 is displayed with various components of the another user's blog, such as a picture & video section 323, a notes of the day 391, a recent activities section 393, current route waypoints section 305, a tasks & status section 315, and a task details section 381. In addition, a current route waypoints 305 section presents waypoints along a current route being taken by the another user, wherein each waypoint 307, 309, 311 and 313 may have an associated blog entry that is created/entered by the another user. The blog entries can be viewed/reviewed/edited by selecting one of the waypoints (such as LN postoffice 307) and reviewing the pictures & video 323 presented, the notes of the day 391 displayed and the recent activities 393 displayed, etc.

The blog screen 303 displayed on a mobile device 301 provides a play audio 335 button that facilitates playing of an audio message or audio blog component, a receive 333 button that facilitates receiving files (such as data files) that are currently available for download by the user (those that may have been uploaded by the another user who made the blog entry being reviewed), and a register 349 button that facilitates registration of the user of the mobile device 301 for receiving subsequent blog entries made by the another user, such subsequent blog entries being automatically presented to the user in the blog screen 303.

In addition, the blog screen 303 facilitates reviewing blog entries received. The pictures & video 323 list displays a list of videos and pictures currently available, and when a user selects one of them, the corresponding video or picture is displayed (such as in a pop-up screen). In addition, the pictures, audio portions and video provided as part of the blog can be attached to notifications sent using the Send button 331. They can also be attached to replies sent (using the reply 339 button) and to forwarded messages/notifications (using the forward 341 button), such attachments facilitated by features that are made available by activating an attach 345 button.

The user browses through the blog screen 303 employing the 'joystick' 375. Upon browsing through a list of pictures & video 323 to a particular item, the user selects the one of the appropriate buttons in the favorites button pane 327. When the user selects a video received (for example), the video is displayed in an optional 'video display pane' (not shown).

Figure 4:
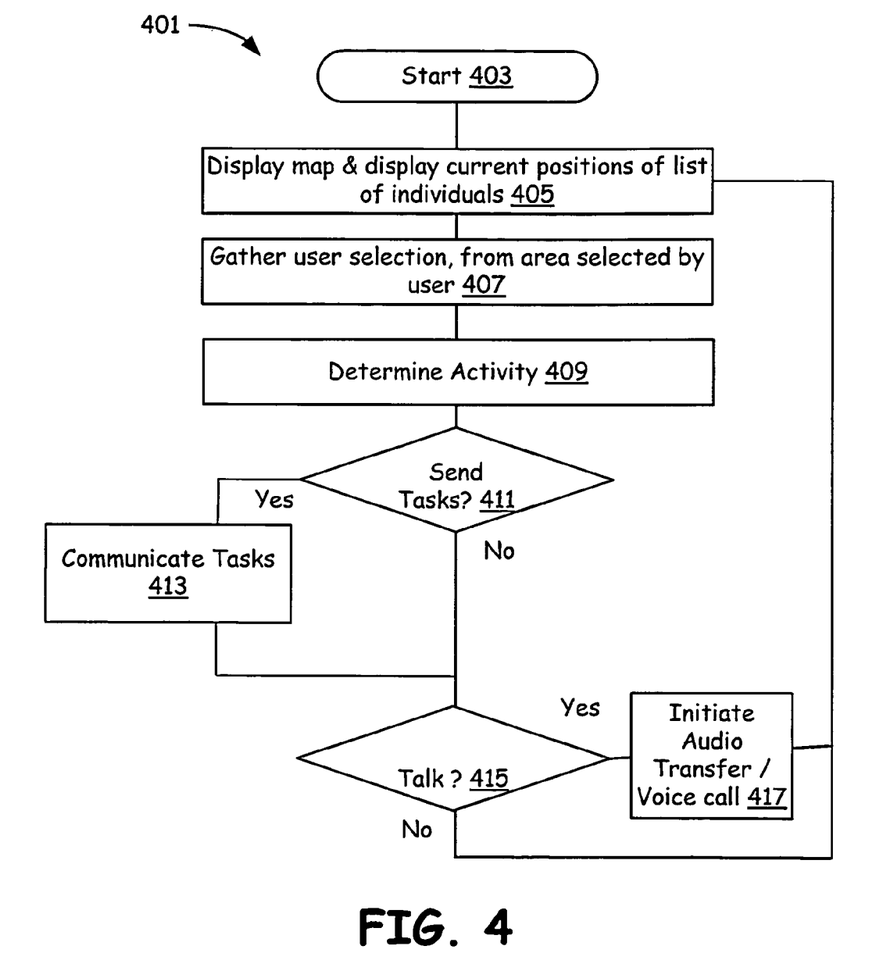
FIG. 4 is a flowchart of an exemplary operation of a mobile device that displays a map and represents individuals belonging to a selected friends list on the map.

FIG. 4 is a flowchart of an exemplary operation of a mobile device that displays a map and represents individuals belonging to a selected friends list on the map. The mobile device is capable of receiving a map and displaying it for a user to view and manipulate. The user can select one of a list of friends and the mobile device displays the current location of the individuals on the selected list onto the map. The mobile device can display the current locations of individuals of more than one list at a time on the map.

At a start block 403, the mobile device starts processing information. At a next block 405, the mobile device displays a map and also displays the current positions (locations) of a selected list of individuals. Then, at a next block 407, the user selects a subset of the individuals represented on the map at their current locations, from an area selected by the user. The area can be selected by the user by dragging a mouse on the displayed map and selecting a rectangular (or some other geometric shape) area on the map. The user can also use a pen based interface and draw a box or some geometric shape on the map thereby specifying a subset of individuals represented on the map as targets for a subsequent action.

Then, at a next block 409, the mobile device determines an activity that has to be conducted, such as the activation of an online call, the recording and communication of an audio message, the communication of a textual message entered by the user, etc.

At a next decision block 411, an attempt is made to determine if the activity is one requiring the sending of one or more selected tasks to the selected individuals (or mobile devices selected on the map). If it is determined that the activity is one requiring the sending of one or more selected tasks, then, at a next block 413, the selected tasks are communicated. At a next decision block 415, an attempt is made to determine if the talk activity has been activated by the user. If at the decision block 411, it is determined that the activity is not one requiring the sending of one or more selected tasks, then, at a next block 415, an attempt is made to determine if the talk activity has been activated by the user. If it is determined that the talk activity has been activated by the user, then at a next block 417, the transfer of a recorded audio message of a voice call is initiated, as appropriate and control is subsequently passed to a next block 405 where the map is displayed again with current positions/locations of a selected list of individuals is represented on the map.

If, at the decision block 415, it is determined that the talk activity has not been activated by the user, then at a next block 405 the map is displayed again with current positions/locations of a selected list of individuals is represented on the map.

Although the flowchart of FIG. 4 is the exemplary operation of a mobile device, it must be understood that a similar user experience is provided to a user accessing the mobile social networking server 189 from the PC/computer/laptop 199. For example, such a user would employ a browser in the PC/computer/laptop 199 to view a map presented by the mobile social networking server 189 wherein one or more friends lists are represented on the map and wherein the user can drag a mouse on the map and select a subset of those individuals represented on the map to interact with.

Figure 5:
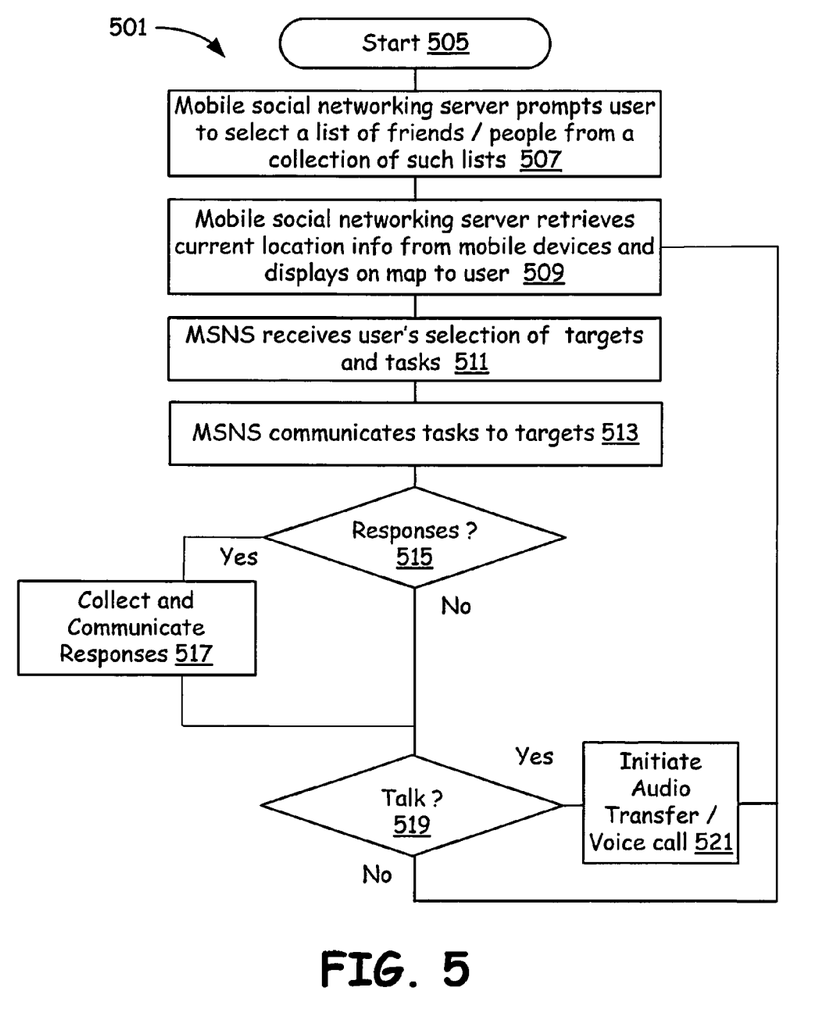
FIG. 5 is a flow chart of an exemplary operation of a mobile social networking server 189 that facilitates display of a map and the representation of one or more friends lists on the map.

FIG. 5 is a flow chart of an exemplary operation of a mobile social networking server 189 that facilitates display of a map and the representation of one or more friends lists on the map. At a start block 505, the mobile social networking server 189 starts processing when a remote user, using a PC/computer/laptop or a mobile device connects with the mobile social networking server 189. Then, at a next block 507, it prompts a user to select one or more lists of friends/people from a collection of such lists. At a next block 509, the mobile social networking server 189 retrieves a current location information from the mobile devices and displays them on the map presented to the user. Those mobile devices that comprise a GPS circuitry return a GPS coordinates (such as a latitude, longitude, etc.). Those mobile devices that do not comprise a GPS circuitry return a cell identification from which the mobile social networking server 189 determines an approximate location information for them. In one embodiment, the mobile social networking server 189 interacts with a coordination server 141 to retrieve such current location from the mobile devices, the coordination server 141 being capable of interacting with a corresponding client in those mobile devices.

At a next block 511, the mobile social networking server (MSNS) 189 receives a user's selection of targets and associated tasks. For example, a user may drag a mouse on the map presented on his PC and select a subset of those individuals (or mobile devices) represented on the map. The user may then assign the same task list or different tasks to those targeted. Or in a different scenario, a user using a mobile device interacts with the mobile social networking server 189 and selects one or more individuals/mobile devices represented on the map presented and selects targets in order to assign the same set of tasks to the targets.

At a next block 513, the mobile social networking server 189 communicates tasks to the targets 513. In a related embodiment, it employs the coordination server 141 to communicate the tasks to the targets.

Then, at a next decision block 515, it determines if any responses are forthcoming from the targets. If it determines that there are responses received, then, at a next block it collects and communicates the responses to the user (who might be using the PC/computer/laptop or a mobile device). If there are no responses received at the decision block 515, or after collecting or communicating the responses at the block 517, it then determines if the user wishes to talk or communicate a recorded message to the targets, at a next block 519.

If it determines that the user does not wish to talk or send recorded messages, then, at the next block 509, it retrieves the current location from the mobile devices and displays them on the map. Otherwise, it initiates a voice call to facilitate talking (such as an adhoc conference call) or it transfers an audio message (such as a recorded message, provided by the user), as appropriate. Thus a voice call is initiated or a recorded message is transferred, based on user selection. Subsequently, the mobile social networking server 189 retrieves current location of the mobile devices and displays them on a map presented to the user, at the next block 509.

Figure 6:
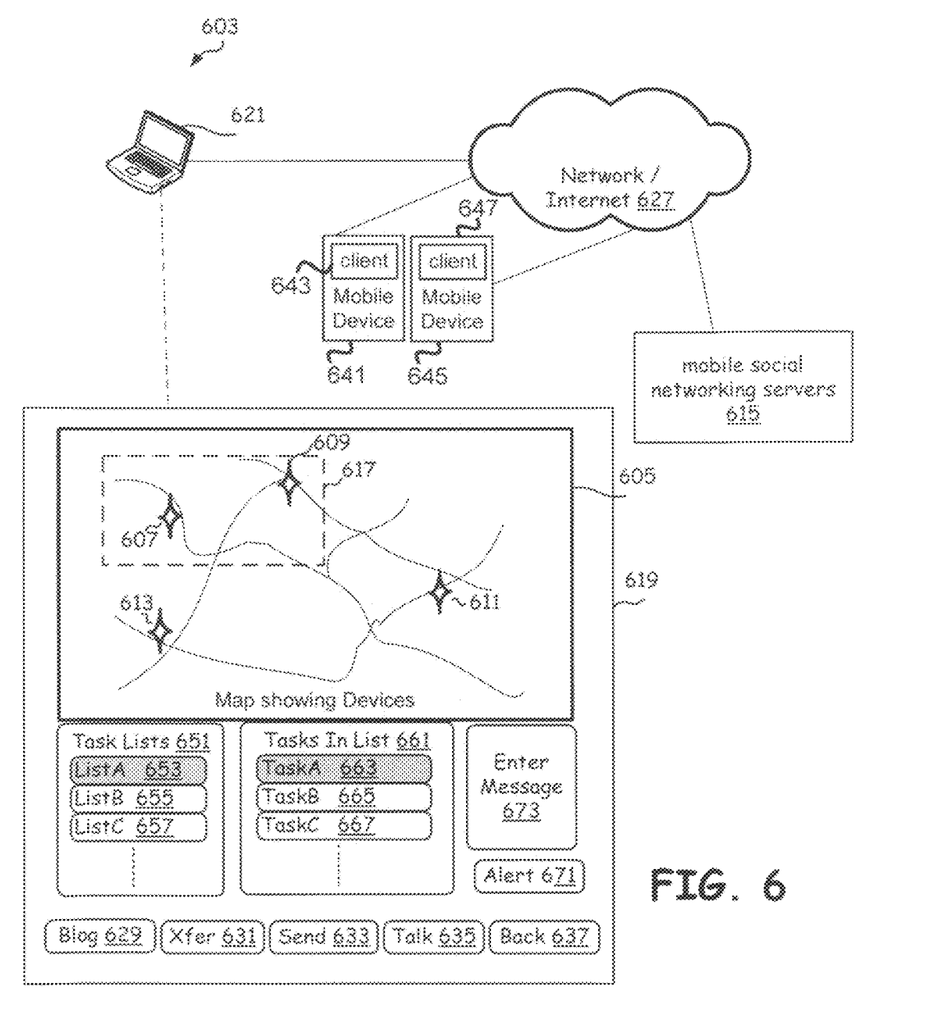
FIG. 6 is a perspective block diagram of a network wherein a user using a PC/computer/laptop is able to view a map presented by a mobile social networking server wherein the map also represents a current location of individuals from one or more friends lists selected by the user.

FIG. 6 is a perspective block diagram of a network 603 wherein a user using a PC/computer/laptop 621 is able to view a map presented by a mobile social networking server 615 wherein the map also represents a current location of individuals from one or more friends lists selected by the user. For example, the user may want to determine where individuals associated to one of his friends lists are currently located, and select that list from a collection of lists. In response the mobile social networking server 615 presents a map along with current locations of the individuals from the selected list represented on the map, such as the exemplary map 605 displayed, which shows devices at heir current locations. The user can then drag a mouse on the PC (or if using a pen device, draw a square or other geometrical shapes using the pen interface) and select a subset of the represented individuals or mobile devices, and then interact with them, such as by sending them task lists, sending them recorded messages, communicating textual messages, initiating conference calls, etc.

The PC/computer/laptop 621 is able to display a map presented by a mobile social networking server 615 to a user, wherein the map also represents a current location of individuals from one or more selected friends list. In one embodiment, a browser based client presents a window 619 comprising the map 605, a task list 651, a tasks in list 661, a message entry panel 673, a talk button 635, a send button 633, a blog button 629 and a transfer button 631. The task lists 651 displays multiple task lists that can be communicated to the selected targets from the map 605, such as those 607, 609 selected by the user within the drawn wireframe or box 617. Each of the task lists 653, 655, 657 comprise multiple tasks, which are displayed when selected in the tasks in list 661, such as a TaskA 663, a TaskB 665 and a TaskC 667 associated with the task list ListA 653.

The exemplary map 605 displays exemplary selected targets 607, 609 within a user selected area of the map 617, wherein the representation 607 is associated with the mobile device 641 and wherein the representation 609 is associated with the mobile device 645. The current locations of mobile devices 641 and 645 are thus represented on the map 605. Both mobile devices 641, 645 are associated with at least one friends list currently selected by the user.

The user can enter a textual message in the message entry panel/box 673, which is then immediately communicated to the target users/devices currently selected in the map 605. In addition, notifications/alerts can be sent by activating the button 671, such alerts may comprise of canned predefined messages requesting the recipients to contact the sender or send a response of some form.

In general, the user can select one of the icons 613, 607, 617 and 611 and in response, details of the user and the device is displayed in a hovering display box (or in some bubble of text that is dynamically displayed). Thus, a user profile and a device profile, or one of them based on configuration/user preference is displayed when the user selects one of the icons on the map, or positions a mouse such that it hovers over an icon/representation.

Activating the send button 633 results in communicating the entered text message in the message entry panel 673, communicating the task list selected in the task lists 651, etc. activating the talk 635 button results in initiating a conference call, communicating a user recorded message, initiating a multicast chat session, etc. based on configuration and user preference. Activating the transfer button 631 results in prompting the user to select one or more files for transfer to the targets selected on the map. Activating the blob button 629 results in retrieving current blog entries for the selected targets on the map and displaying them to the user (using appropriate blog display screens, not shown here).

In general, the present invention makes it possible to communicate multimedia contents, tasks lists, files, messages, etc. to one or more currently selected targets that are represented on a map. The targets comprise individuals/devices, such as mobile devices, based on their current location information, which may be based on GPS coordinates or cell identification retrieved from the mobile devices. This has a lot of applications and addresses a market need.

The present invention discloses a mobile device comprising a global positioning system (GPS) receiver circuitry capable of pinpointing a location and providing such information to a mobile social networking server. It employs a client software capable of interacting with the GPS receiver circuitry and communicating information to a coordination server or to the mobile social networking server. The client software receives a request to present a map with representation of current locations of individuals/mobile devices, and it displays the map for the user while allowing the user to select a subset of the represented icons on the map, to be targets for further communications. The GPS coordinates are based on at least one of a latitude, longitude, and height system, earth centered Cartesian coordinates, earth centered earth fixed, earth centered inertial, and east north up.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

Although the present invention has been described in terms of GPS coordinates/and navigational information communication involving mobile phones and computers, it must be clear that the present invention also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A device comprising:
   a processing circuitry;
   a communication module;
   a client software capable of interacting with a mobile social networking server employing the communication module;
   the client software displaying a map comprising representations of individuals of at least one of a plurality of friends lists managed by the user of the device, at their associated current locations on the map;
   the client software displaying an identifier for each of a plurality of task lists, wherein each task list comprises a plurality of tasks, and wherein each of the plurality of tasks comprises details of a piece of work to be completed;
   the client software accepting from the user of the device, input representing selection of one of the plurality of task lists;
   the client software displaying the plurality of tasks of the selected task list;
   the client software facilitating the selection of a target collection of individuals employing at least one of the representations of individuals of the at least one of a plurality of friends lists, for subsequent interactions;
   the client software automatically assigning at least one task from the list of tasks selected by the user, to at least one individual in the target collection, based upon the at least one task and the current location of the at least one individual, and
   the client software sending at least one message communicating the at least one task to the assigned at least one individual in the target collection.

2. The device of claim 1, wherein the subsequent interactions comprise communicating at least one task to a target device currently associated with at least one individual in the target collection.

3. The device of claim 1, wherein the selection of the target collection comprises determining a drag area specified by the user by drawing a geometrical shape on the map and identifying those of the representations of individuals of the at least one of a plurality of friends lists as being currently located inside the drag area based on their associated current locations on the map.

4. The device of claim 3, wherein the subsequent interactions comprise communicating with the individuals in the target collection employing one of an audio conference means, a video conference means, a chat means, a textual data communication means, an audio recorded message communicating means, an instant messaging means and an email means.

5. The device of claim 3, wherein the subsequent interactions comprise automatically retrieving blog content for each of the individuals in the target collection and presenting the blog content to the user of the device.

6. The device of claim 3, wherein the subsequent interactions comprise automatically sending, to the individuals in the target collection, a request to provide data.

7. A mobile social network server comprising:
   a current navigational data module for receiving current navigational data from a plurality of user mobile devices communicatively coupled to the mobile social network server;
   a web map service module for dynamically producing a map of spatially referenced data;
   a plurality of friends lists, wherein each of the plurality of friends lists comprises contact information for each of a plurality of friends;
   the web map service module displaying, on a map presented to a first user, a representation of each of one or more individuals at respective current locations for one or more of the plurality of friends lists;
   the mobile social network server receiving a target collection comprising other users identified by the first user based on the representation of individuals of the one or more of the plurality of friends lists;
   the mobile social network server sending a message comprising a corresponding list of tasks to each of the other users in the target collection, wherein the list of tasks for each of the other users is automatically assigned from a list of tasks selected by the first user, based upon the list of tasks selected by the first user and respective current locations of each of the other users; and
   wherein the list of tasks selected by the first user comprises a plurality of tasks and is selected by the first user from a plurality of tasks lists, and wherein each task of the plurality of tasks comprises details of a piece of work to be completed.

8. The mobile social network server of claim 7 further comprising:
   wherein the mobile social network server communicatively couples to a second server; and
   wherein the current navigational data module receives the current navigational data from the second server, the current navigational data comprising at least current location information from a plurality of mobile devices associated with the one or more of the plurality of friends lists.

9. The mobile social network server of claim 7, wherein the mobile social network server presents the map comprising representation of individuals of the one or more of the plurality of friends lists to a user.

10. The mobile social network server of claim 7, wherein the target collection comprises a list of phone numbers of mobile devices associated with selected ones of the representation of individuals of the one or more of the plurality of friends lists.

11. The mobile social network server of claim 7, wherein the target collection is specified by the user employing a drawing operation of a geometrical shape on the map presented to the user.

12. The mobile social network server of claim 7, wherein the task list communicated to each of the items in the target collection is specified by the user.

13. A method of communicating between a first mobile device and a plurality of second mobile devices, the method comprising:
   displaying, by the first mobile device, a representation of locations of the plurality of second mobile devices on a map presented to a user of the first mobile device;
   accepting a target collection, by the first mobile device, that is provided by the user, wherein the target collection comprises one or more of the plurality of second mobile devices;
   assigning one or more tasks from a user specified list of tasks, by the first mobile device, to at least one second mobile device of the target collection, based upon the user specified tasks and a current location of the at least one second mobile device of the target collection, wherein the user specified list of tasks is selected from a plurality of tasks lists and comprises a plurality of tasks, and wherein each task comprises details of a piece of work to be completed;
   communicating a message, to the at least one second mobile device of the target collection from the first mobile device, the message comprising the assigned one or more tasks from a user specified list of tasks;
   receiving responses, by the first mobile device, from the at least one second mobile device of the target collection; and
   showing the responses by the first mobile device, to the user.

14. The method according to claim 13, wherein accepting comprises:
   facilitating a drawing operation by the user of a geometrical shape on the map presented to the user; and
   determining the target collection based on the representation of the plurality of second mobile devices on the map enclosed within the geometrical shape.

15. The method according to claim 13, wherein assigning further comprises:
   identifying a list of tasks to be completed;
   mapping the list of tasks to the target collection based on the current location information associated with each of the one or more of the plurality of second mobile devices in the target collection; and
   prompting the user to communicate ones from the mapping of the list of tasks to corresponding ones of the one or more of the plurality of second mobile devices in the target collection.

16. The method according to claim 13, further comprising:
   conferencing, employing audio conferencing or video conferencing means, with the target collection, by the first mobile device.

17. The method according to claim 13 further comprising:
   communicating a message, employing a textual message means or an audio message means, to the target collection, by the first mobile device.

18. A hardware device communicatively coupled as required to a server, the hardware device comprising:
   a client software configured to interact with the server;
   the client software configured to display an identifier for each of a plurality of task lists, wherein each task list comprises a plurality of tasks, and wherein each of the plurality of tasks comprises details of work to be completed;
   the client software configured to display a map comprising representations of individuals of at least one of a plurality of people lists at their associated current locations on the map;
   the client software configured to support selection of one of the plurality of task lists and review of the plurality of tasks of the selected task list;
   the client software configured to support user selection of a target collection of individuals from those individuals currently displayed on the map, for subsequent interactions;
   the client software configured to support assigning of at least one task from the selected task list, to at least one individual in the target collection; and
   the client software sending at least one message communicating the at least one task to the at least one individual in the target collection.

19. The hardware device of claim 18 further comprising:
   the client software configured to receive at least one task completion message from the at least one individual in the target collection.

20. The hardware device of claim 18
   wherein the selection of the target collection comprises determining a drag area drawn using a geometrical shape on the map by the user and identifying those individuals of the at least one of a plurality of people lists who are currently located inside the drag area based on their associated current locations on the map.

\* \* \* \* \*